United States Patent [19]

Chigira

[11] Patent Number: 5,501,367
[45] Date of Patent: Mar. 26, 1996

[54] ICE FEEDER

[75] Inventor: Noboru Chigira, Saitama, Japan

[73] Assignee: Sanyo Electric Co., Ltd., Loriguchi, Japan

[21] Appl. No.: 257,337

[22] Filed: Jun. 9, 1994

[30] Foreign Application Priority Data

Jun. 15, 1993 [JP] Japan ..................... 5-168465

[51] Int. Cl.⁶ ..................................... B67D 5/62
[52] U.S. Cl. ................. 222/55; 222/129.4; 222/146.6; 62/354
[58] Field of Search .................. 62/354; 222/55, 222/63, 129.1, 129.3, 129.4, 146.6

[56] References Cited

U.S. PATENT DOCUMENTS

| | | | |
|---|---|---|---|
| 3,059,450 | 10/1962 | Mueller et al. | 222/146.6 X |
| 3,256,710 | 6/1966 | Dedricks et al. | 62/354 X |
| 3,378,170 | 4/1968 | Reynolds | 222/129.4 |
| 3,496,734 | 2/1970 | Schumacher | 62/354 X |
| 4,417,671 | 11/1983 | Kawasaki et al. | 222/63 X |
| 4,426,851 | 1/1984 | Neumann | 62/354 X |
| 4,771,609 | 9/1988 | Funabashi | 62/354 X |
| 5,219,008 | 6/1993 | Shannon | 222/63 X |
| 5,413,249 | 5/1995 | Chigira | 222/55 |

FOREIGN PATENT DOCUMENTS

0033446  3/1978  Japan ..................... 62/354

*Primary Examiner*—Andres Kashnikow
*Assistant Examiner*—Kenneth Bomberg
*Attorney, Agent, or Firm*—Darby & Darby

[57] ABSTRACT

An ice feeder stores ice in an ice container, and supplies ice from an ice gate provided in the ice container through a supply passage extending therefrom. A sensor arranged on the supply passage detects passage of ice delivered to generate a detection signal. An amount of delivered ice is measured based on the detection signal from the sensor. When a time required for the amount of delivered ice to reach a predetermined value exceeds a predetermined time period, a signal indicative of no ice stock is generated. Alternatively, when the amount of ice delivered within a predetermined time period does not reach a predetermined amount, the signal indicative of no ice stock is generated.

16 Claims, 5 Drawing Sheets

ICE FEEDER

BACKGROUND OF THE INVENTION

1. Field of the Invention

This invention relates to an ice feeder for feeding ice chips to a beverage, such as iced coffee, which is capable of detecting no or insufficient stock of ice chips.

2. Prior Art

As a conventional ice feeder, there is an ice making apparatus proposed e.g. by Japanese Patent Publication (Kokoku) No. 61-13279, which comprises an auger-type ice making machine having an ice freezer for making ice chips and an ice container formed in one piece with the ice freezer for storing ice chips made by the ice freezer, and is adapted to feed a predetermined amount of ice chips to a cup based on a vend command supplied to the ice making apparatus. However, when vend products continue to be sold so frequently that production of ice chips cannot follow up feed or delivery thereof for use in vend products, the stock of ice chips in the ice container becomes insufficient for a vend product any longer. If products continue to be on sale in this state of the vending machine, a hot beverage would be supplied to a purchaser when he selected an iced beverage. Therefore, the vending machine incorporates an ice feeder which is adapted to detect no or insufficient stock of ice chips to generate a signal indicative of this state of the ice container, based on which sales control is performed to inhibit iced vend products from being sold in such a state of the vending machine.

The detection of no or insufficient stock of ice chips is conventionally performed in the following manner: The auger-type ice making machine includes a limit switch arranged on the top of the ice container, which is turned on by upward pressure created by an increasing amount of ice chips within the ice container, and control means for starting calculation of a residual amount of ice chips when the limit switch is turned off after it has been turned on. More specifically, the control means initializes a count value of a counter incorporated therein when the limit switch is turned on, detecting fullness of the ice container, and starts to subtract, from the count value of the counter, a value proportional to the number of sales carried out thereafter while at the same time adding thereto a value proportional to an amount of ice chips made by the ice making machine, thereby calculating a residual amount of ice chips stored in the ice container. The control means determines from results of this calculation (i.e. the count value of the counter) that the ice container no longer holds a sufficient stock of ice chips for a vend product, and generates a no-ice-stock signal to the vending machine, which sets itself to a vend stop status in response to the no-ice-stock signal.

The ice chips are stored as a heap in the ice container, and dispensed in the order of lowermost chips to upper ones by the gravitational force of the heap. Therefore, an amount of ice chips supplied to a cup varies with a residual amount of ice chips heaped within the ice container. Furthermore, the amount of supply of ice chips also depends on an individual gate of the ice container for controlling delivery of ice chips and other component parts which are manufactured with inevitable variations among lots. Therefore, a final result of calculation of a residual amount of ice chips stored in the ice container by the above conventional method becomes unequal to an actual amount of ice chips stored in the ice container. This causes an erroneous determination that ice chips are out of stock in spite of the fact that the ice container holds a plenty amount of stock, or an incapability of detection of an insufficient stock of ice chips which is less than a predetermined supply amount, or even no stock of ice chips.

As a result, the ice feeder conventionally incorporated in a vending machine can be a cause of reduced sales of vend products due to inhibition of vending carried out when products (beverages) can be properly sold, or a cause of faulty sales of hot beverages to purchasers who selected iced beverages.

SUMMARY OF THE INVENTION

It is the object of the invention to provide a ice feeder which is capable of accurately detecting no or insufficient stock of ice chips in an ice container.

To attain the above object, according to a first aspect of the invention, there is provided an ice feeder comprising:

- ice storing means for storing ice;
- an ice gate provided in the ice storing means for controlling delivery of the ice from the ice storing means;
- a supply passage extending from the ice gate for supplying the ice therethrough;
- sensor means arranged in the supply passage for detecting passage of the ice delivered from the ice storing means and for generating a detection signal indicative of the passage of the ice;
- supply amount measuring means for measuring an amount of the ice delivered, based on the detection signal from the sensor means; and
- control means for generating a no-ice-stock signal indicative of an insufficient stock of ice held in the ice storing means when a time period required for the amount of the ice delivered which is measured by the supply amount measuring means to reach a first predetermined value exceeds a first predetermined time period.

Preferably, the ice feeder further comprises supply inhibiting means for inhibiting the ice feeder from supplying the ice for a second predetermined time period.

More preferably, the supply inhibiting means has display means for displaying a no-ice-stock state of the ice feeder.

Preferably, the ice feeder further comprises actuator means for controlling the opening and closing of the ice gate, and the control means delivers a gate-closing command signal to the actuator means to cause the actuator means to close the ice gate when the amount of the ice delivered which is measured by the supply amount measuring means has reached the first predetermined value.

More preferably, the control means delivers an opening command signal to the actuator means to cause the actuator means to open the ice gate for a third predetermined time period which is shorter than a time period normally corresponding to the first predetermined value of the amount of the ice delivered, irrespective of whether the amount of the ice delivered which is measured by the supply amount measuring means has reached the first predetermined value.

Preferably, the ice feeder further comprises ice making means for making ice and for supplying the ice thus made to the ice storing means, and the second predetermined time period is equal to a time period required by the ice making means to make a second predetermined amount of ice.

More preferably, the ice feeder further comprises supply signal input means for inputting to the ice feeder a supply command signal directing supply of the ice, and the actuator means starts to cause the ice gate to open at the same time as the supply command signal is input, while the control means starts to measure the first predetermined time period at the same time the supply command signal is input.

According to a second aspect of the invention, there is provided an ice feeder comprising:

ice storing means for storing ice;

an ice gate provided in the ice storing means for controlling delivery of the ice from the ice storing means;

a supply passage extending from the ice gate for supplying the ice therethrough;

sensor means arranged in the supply passage for detecting passage of the ice delivered from the ice storing means and for generating a detection signal indicative of the passage of the ice;

supply amount measuring means for measuring an amount of the ice delivered, based on the detection signal from the sensor means; and control means for generating a no-ice-stock signal indicative of an insufficient stock of ice held in the ice storing means when the amount of the ice delivered from the ice storing means which is measured by the supply amount measuring means does not reach a first predetermined value within a first predetermined time period.

Preferably, the ice feeder further comprises supply inhibiting means for inhibiting the ice feeder from supplying the ice for a second predetermined time period.

Preferably, the supply inhibiting means has display means for displaying a no-ice-stock state of the ice feeder.

More preferably, the ice feeder further comprises actuator means for controlling the opening and closing of the ice gate, and the control means performs control such that the actuator means causes the ice gate to open for the first predetermined time period.

Preferably, the ice feeder further comprises ice making means for making ice and for supplying the made ice to the ice storing means, and the second predetermined time period is equal to a time period required by the ice making means to make a second predetermined amount of ice.

The above and other objects, features, and advantages of the invention will become more apparent from the following detailed description taken in conjunction with the accompanying drawings.

DETAILED DESCRIPTION

Next, there will be described an ice feeder of the invention with reference to drawings showing an embodiment thereof.

Figure 1:
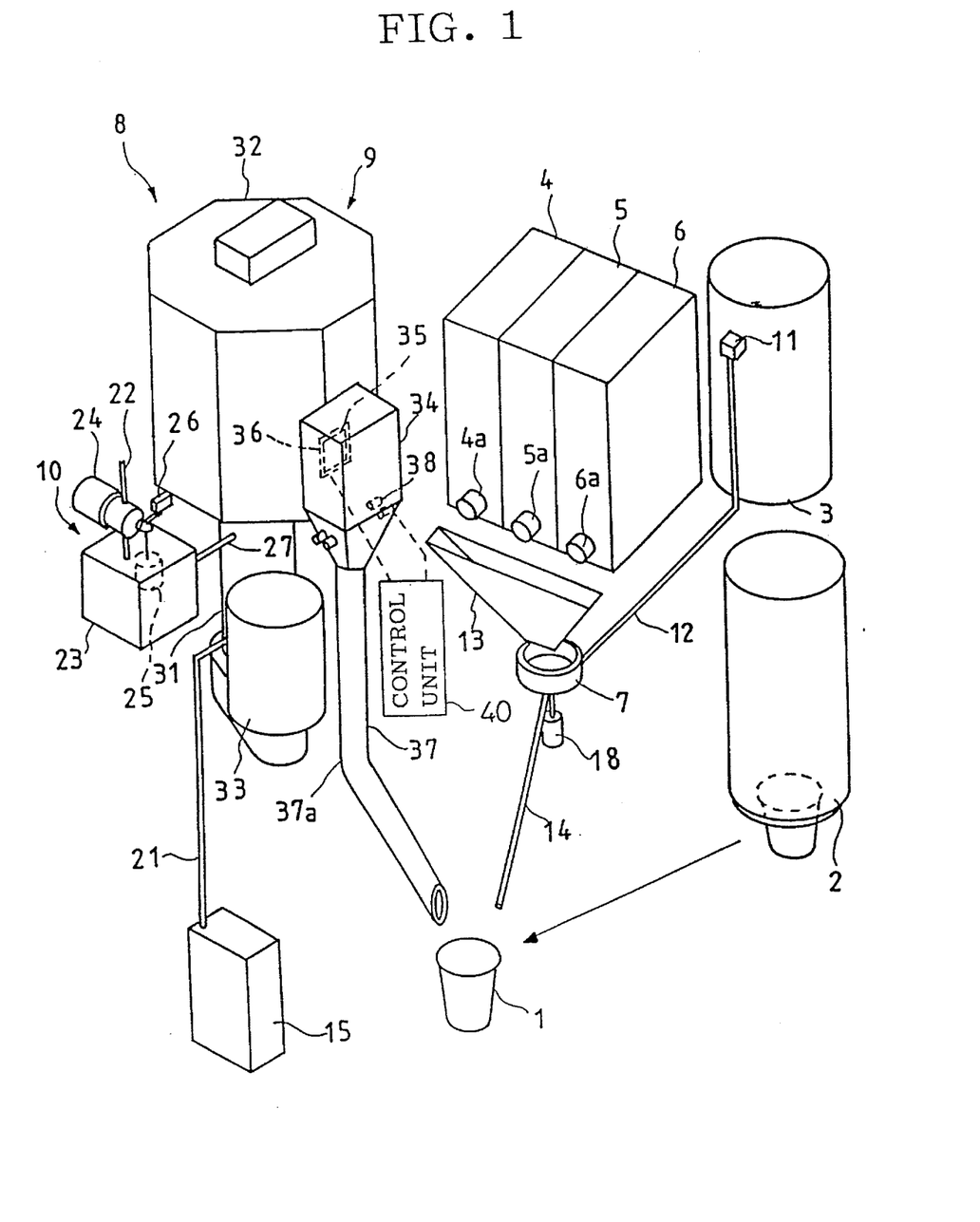
FIG. 1 is a perspective view of a vend product-preparing system for a vending machine, in which is incorporated an ice feeder according to an embodiment of the invention.

FIG. 1 shows the arrangement of a vend product-preparing system for a cup vending machine, which has the ice feeder incorporated therein. The vend product-preparing system is comprised of a cup dispenser 2 for dispensing cups 1, a hot water tank 3 having a heater, not shown, incorporated therein, a sugar canister 4, a cream canister 5, and a coffee canister 6, as material feeders, a mixing bowl 7, and an ice making apparatus 8.

Powder materials of sugar, cream, and coffee, supplied from the respective canisters 4, 5, and 6, and hot water supplied from the hot water tank 3 are mixed in the mixing bowl 7 to prepare a mixture, and then, this mixture and ice chips supplied from the ice making apparatus 8 are supplied to a cup 1 supplied from the cup dispenser 2, thereby completing a predetermined procedure of preparation or cooking of a beverage (iced coffee).

The cup dispenser 2 holds a number of cups in stock, and when a vending operation of the vending machine starts, it delivers the lowermost one of the cups 1 to a predetermined setting location as notionally indicated by an arrow in FIG. 1 (in reality, the cup 1 is dropped therein).

The hot water tank 3 has the heater within it as mentioned above, and supplies hot water to the mixing bowl 7 from a port formed in an upper portion thereof. A hot water valve 11 is mounted on the port, and a hot water supply pipe 12 extends from the hot water valve 11 to the mixing bowl 7 to thereby connect the hot water tank 3 to the mixing bowl 7.

The sugar canister 4, the cream canister 5, and the coffee canister 6 hold sugar, cream, and instant coffee, in stock, and are provided with outlet ports 4a, 5a, and 6a, at lowermost portions of front walls thereof, respectively. The outlet ports 4a, 5a, and 6a have outlet valves formed therein for permitting predetermined amounts of powder materials to be supplied to the cup 1. On the other hand, under the outlet ports 4a, 5a, and 6a, are arranged a powder chute 13 via which powder materials dropped from the outlet ports 4a, 5a, and 6a, are introduced into the mixing bowl 7.

Figure 2:
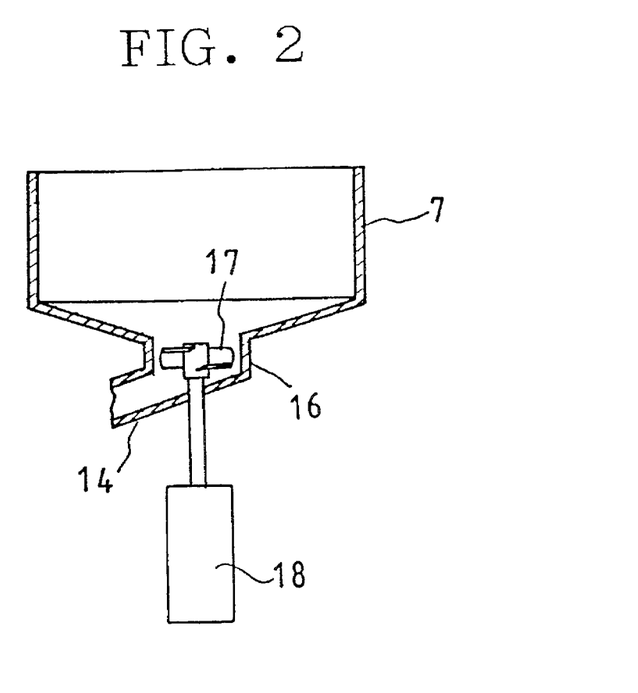
FIG. 2 is a cross-sectional view of a mixing bowl.

The mixing bowl 7 mixes the powder materials dropped from the outlets ports 4a, 5a, and 6a of the sugar canister 4, the cream canister 5, and the coffee canister 6, and hot water poured via the hot water supply pipe 12 from the hot water tank 3. As shown in FIG. 2, the mixing bowl 7 is formed with an opening at the bottom 16 thereof to communicate with a product supply pipe 14 through which a liquid mixture (beverage) is poured into the cup 1 placed in a predetermined setting position. Further, the mixing bowl 7 has an impeller 17 arranged in the bottom 16 thereof for stirring the liquid mixture, which is connected via a shaft to a stirring motor 18. So long as the impeller 17 is rotating, the mixing bowl 7 prevents the liquid mixture from flowing into the product supply pipe 14 by centrifugal forces imparted by rotation of the impeller 17 to the liquid mixture, and when the impeller 17 ceases to rotate, the liquid mixture is permitted to flow into the product supply pipe 14, thus serving both as a mixer and a valve.

The ice making apparatus 8 is a so-called auger type which is comprised of an ice freezer 9, a cooling unit 15, and a water feed unit 10. The ice making apparatus 8 makes ice by cooling water supplied from the water feed unit 10 into the ice freezer 9 by means of a coolant circulating through the ice freezer 9 and the cooling unit 15 via a coolant pipe 21 formed by a supply pipe and a return pipe, neither of which is shown.

The water feed unit 10 is comprised of a cistern 23 for storing water supplied from a water supply pipe 22, a water supply solenoid valve 24 for opening and closing the water supply pipe 22, a float 25 for detecting a level of water in the cistern 23, a microswitch 26 which is turned on or off by the float 25 which moves up or down with the level of water within the cistern 23, and a freezing water supply pipe 27 for feeding water to the ice freezer 9. The cistern 23 is supplied with freezing water to be frozen into ice from the water supply pipe 22, and always contains a predetermined level of water therein by the operation of the electromagnetic valve 24 which is controlled by the cooperative function of the float 25 and the microswitch 26, while permitting a proper amount of freezing water to be supplied to the ice freezer 9.

The ice freezer 9 is comprised of a cooling cylinder 31 to which is connected the freezing water supply pipe 27, an ice container (ice storing means) 32 formed on top of the cooling cylinder 31, and a motor 33 arranged at a location adjacent to the freezing cylinder 31. The cooling cylinder 31 has a rotating blade device (auger), not shown, inserted therein, which is driven for rotation by the motor 33 to force an ice layer formed within the cooling cylinder 31 upward, thereby compressing the ice layer into ice chips. The ice chips thus produced are forced upward to move through the top of the cylinder into the ice container 32 to be stored therein in a predetermined amount. The ice chips stored in the ice container 32 are stirred by a stirrer, not shown, arranged within the ice container 32.

On the other hand, the ice container 32 has an ice outlet port 35 formed through a lower portion of a side wall thereof for delivering ice chips, with a covering 34 provided thereon to shield the ice outlet port 35. An ice gate 36 is arranged inside the covering 34 for opening and closing the ice outlet port 35. The opening and closing operations of the ice gate 36 are controlled by a control unit (control means) 40 comprised of a microcomputer. The covering 34 is configured such that the width of a lower part thereof is reduced to form a contracted part communicating with an ice chute 37 for supplying ice chips therethrough into the cup 1. Further, a sensor 38 is arranged at the contracted part of the covering 34. In this connection, it should be noted that variation of a falling speed of ice chips is a dominant factor of accuracy in measuring an amount of ice chips having passed before the sensor 38. Therefore, the sensor 38 is arranged, in this embodiment, at the contracted part of the covering 34 where there occurs little variation in the falling speed of ice chips.

Figure 3:
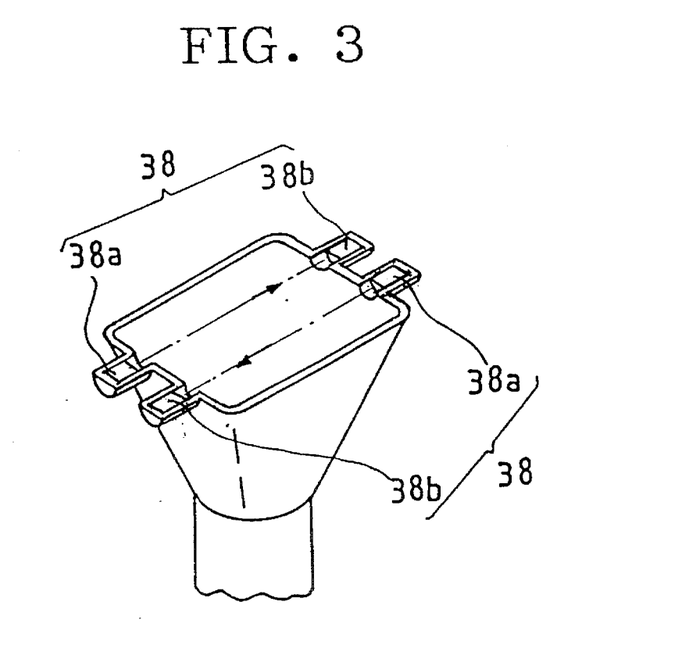
FIG. 3 is a perspective view of a sensor and its environment.

The sensor 38 is constructed, as shown in FIG. 3, such that two sets of optical sensors each comprising a light emitting element 38a and a light receiving element 38b are provided in opposite directions. The light emitting element 38a and the light receiving element 38b are connected to the control unit 40, and generate ice chip passing signals based on changes in output voltages from the optical sensors caused by falling ice chips which cross light paths formed between the light emitting elements 38a and the light receiving elements 38b, to supply same to the control unit 40. Light emitted from each light emitting element (photodiode) of the sensor 38 forms a diverging ray, and therefore, in the present embodiment, the two sets of optical sensors are arranged in opposite directions, as shown in FIG. 3, thereby preventing errors in detection by each light receiving element (photosensor).

Figure 4:
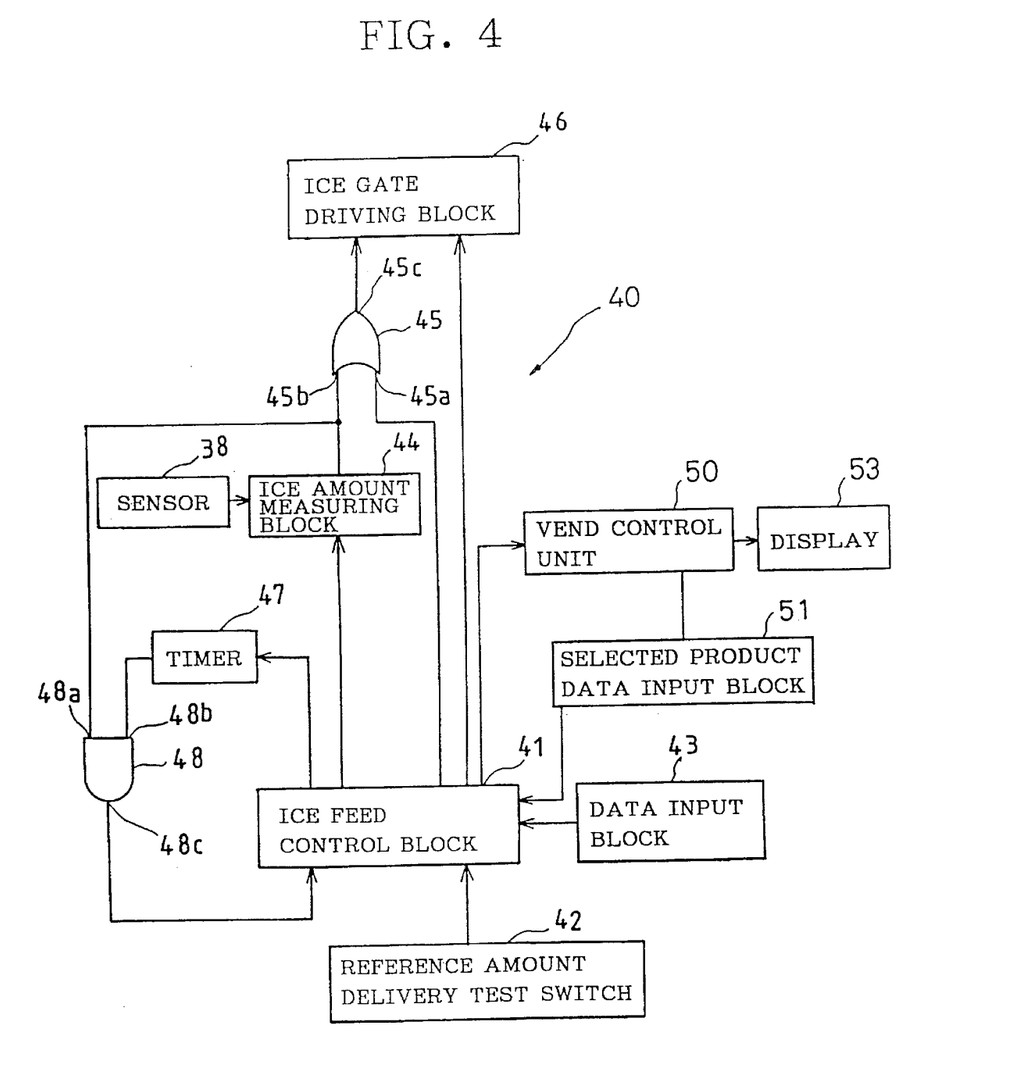
FIG. 4 is a block diagram showing an electric circuit configuration of a control unit of the ice feeder according to the embodiment.

Next, the electric circuit configuration of the control unit 40 will be described with reference to FIG. 4. Reference numeral 41 designates a ice feed control block for controlling the opening and closing of the ice gate 36. The ice feed control block 41 has input terminals connected to a reference amount delivery test switch 42, a data input block 43, and a selected product data input block 51, respectively, and output terminals connected to an ice amount measuring block 44, one input terminal 45a of an OR gate 45, an ice gate driving block (actuator means) 46 for driving the ice gate 36 to open and close the ice outlet port 35, a timer 47, and a vend control unit 50 for controlling sales of vend products. The vend control unit 50 is connected to a display 53 for displaying "OUT OF ORDER" when the no ice stock state is detected, and also to the selected product data input block 51.

The ice amount measuring block 44 has an input terminal connected to the sensor 38 and its output connected to the other input terminal 45b of the OR gate 45 and one input terminal 48a of an AND gate 48. The OR gate 45 has its output terminal 45c connected to an input terminal of the ice gate driving block 46, while the AND gate 48 has the other input terminal 48b connected to an output terminal of the timer 47, and its output terminal 48c connected to an input terminal of the ice feed control block 41.

Next, there will be described a vending operation of the vending machine including the ice feeder according to the present embodiment which is formed by the ice making apparatus 8 and the control unit 40. Let it be assumed that a purchaser puts a coin or a bill into the vending machine and selected iced coffee. If the optimal amount of ice chips to be supplied to a cup has been set e.g. to 100 g, the ice feed control block 41 responsive to a selected product signal from the selected product data input block 51 stores data of an ice supply amount of 100 g set for the iced coffee. On the other hand, the control unit 40 operates to cause the ice gate 36 to open the ice outlet port 35, thereby starting to deliver ice chips from the ice container 32 of the ice freezer 9. The sensor 38 detects presence of ice chips delivered and passing before it to generate the ice chip passing signals, based on which the control unit 40 performs the feedback-control to close the ice gate 36.

Now, the ice feed control operation of the control unit 40 will be described in further detail. The ice feed control block 41 stores in advance data of an amount of ice chips delivered per unit time when the ice gate 36 is open, as reference ice amount data. The reference ice amount data provides a reference value for setting an amount of ice chips to be delivered, which is determined by turning on the reference amount delivery test switch 42 to open the ice gate 36 for a predetermined time period, and measuring an amount of ice chips delivered over the predetermined time period. The data is input to the ice feed control block 41 via the data input block 43.

The ice feed control block 41 stores the optimal amounts of ice chips suitable for respective vend products, as ice amount data, and determines a set opening time period over which the ice gate 36 should be opened, in response to the selected product signal from the selected product data input block 51, based on the ice amount data indicated by the signal and the ice amount reference data. Then, the ice feed control block 41 delivers an ice gate opening signal to the ice gate driving block 46 to cause same to open the ice gate 36, and at the same time supplies a minimum opening period-insuring signal (high-level signal) to the input terminal 45a of the OR gate 45 to ensure opening of the ice gate 36 over a minimum opening time period which is determined by multiplying the set opening time period by a coefficient of e.g. 0.8.

On the other hand, the ice amount measuring block 44 determines a time period over which the ice gate 36 should be opened based on the ice chip passing signals from the sensor 38 and the ice amount data supplied from the ice feed control block 41. More specifically, the ice amount measuring block 44 shapes the waveform of the logical sum of two ice chip passing signals delivered from the respective optical sensors of the sensor 38 by means of a comparator incorporated therein, not shown, to generate a pulse signal. The ice amount measuring block 44 causes reference pulses delivered from a reference pulse generator, not shown, which is incorporated therein, and the generated pulse signal, to be input to an AND gate, not shown, which incorporated therein, to thereby count the number of reference pulses generated within duration of each pulse of the pulse signal. Thus, the ice amount measuring block 44 measures a total time period for one delivery of a predetermined amount of ice chips, during which ice chips have actually passed or existed before the sensor 38. The ice amount measuring block 44 then determines an amount of ice chips delivered from the ice container based on the measured time period (therefore, a time period required for measuring the predetermined amount of ice chips delivered varies with density of ice chips in a flow of delivery). In this way, the ice amount measuring block 44 determines an amount of ice chips delivered and passed before the sensor 38, and delivers an opening signal (high-level signal) to the OR gate 45 to open the ice gate 36 until the amount of ice chips delivered and passed before the sensor 38 reaches the amount of ice chips set by the ice amount data.

The OR gate 45 delivers a logical sum signal indicative of the logical sum of the opening signal from the ice amount measuring block 44 and the minimum opening period-insuring signal from the ice feed control block 41 to the ice gate driving block 46.

The ice gate driving block 46 generates a solenoid driving signal in response to the ice gate opening signal delivered from the ice feed control block 41, thereby driving a solenoid, not shown, to open the ice gate 36. Then, the ice gate driving block 46 also generates an ice gate closing signal in synchronism with a fall of the logical sum signal delivered from the OR gate 45 to drive the solenoid to close the ice gate 36. This terminates the feedback control of the control unit 40. However, to cope with a possible incapability of the ice amount measuring block 44 for delivering the opening signal over a proper time period (e.g. approximately 3 seconds normally corresponding to delivery of 100 g of ice chips required for an iced coffee) due to lowered sensor performance caused by water drops attached to the sensor 38 during measurement of the amount of ice chips delivered, the ice gate 36 is opened over the minimum opening time period (e.g. 2.4 seconds) during which the minimum opening period-insuring signal is delivered to thereby ensure supply of an amount (approximately 80 g) of ice chips to the cup 1.

Figure 5:
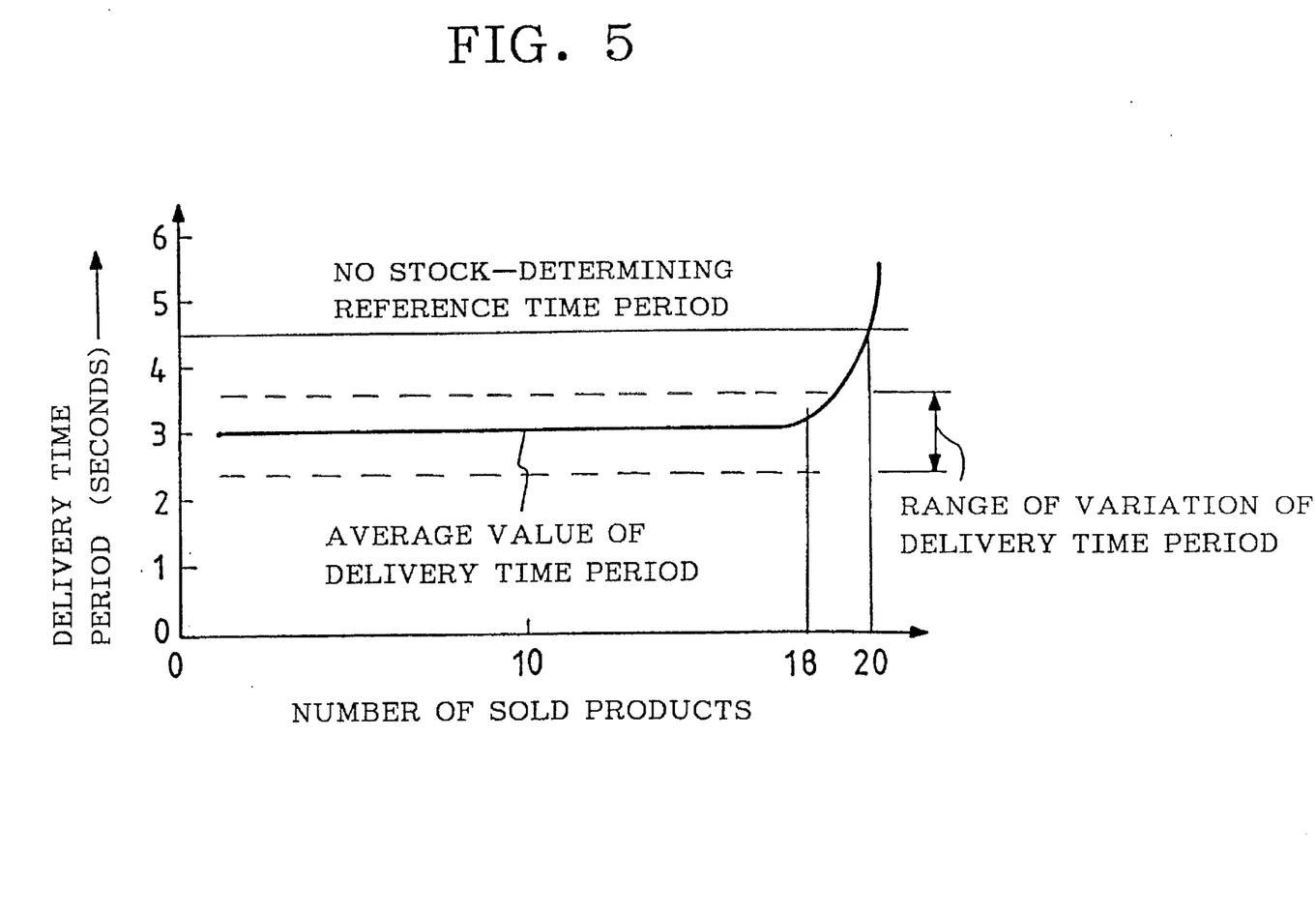
FIG. 5 is a diagram showing a relationship between the number of sold products and a time period required in feeding a predetermined amount of ice chips to each product.

Next, a no ice stock-detecting operation of the ice feeder according to the embodiment will be described in detail. First, a no stock-determining reference signal used in the no ice stock-detecting operation of the ice feeder is a reference signal for causing the display 53 to display "OUT OF ORDER" (which means, in the present case, no stock of ice chips) when a duration of the opening signal exceeds the duration of the no stock-determining reference signal. Now, details of this procedure will be described with reference to FIG. 5, which illustrates the relationship between a time period required for delivery of 100 g of ice chips, indicated by the ordinate, and the number of products sold in succession, i.e. without any intermittent time period, indicated by the abscissa. As shown in this figure, until approximately 18 products have been sold, an averaged time period required in delivery of ice chips continues to be approximately 3 seconds even if the products have been sold in succession. However, when the number of products sold in succession exceeds 18, the required time period is drastically prolonged. This is because when the amount of ice chips held in stock within the ice container 32 becomes smaller than a predetermined value, much more time is required in delivery of the same predetermined amount of ice chips, due to less or no weight of ice chips acting on ice chips positioned at the bottom of the ice container 32 to discharge same therefrom via the ice outlet port 35, and due to a decreasing amount of ice chips discharged from the ice outlet port 35 per unit time resulting from a decreasing amount of ice chips raked out by a stirring rod, not shown, of the stirrer. In this connection, the solid line in FIG. 5 designates a no stock-determining reference time period (duration of the no stock-determining reference signal), while two broken lines designate upper and lower limits defining a range of variation of a time period required in delivery of the predetermined amount (100 g) of ice chips before 18 products have been sold in succession.

The present embodiment utilizes this phenomenon that when the residual amount of ice chips held in stock within the ice container 32 is scarce, the time period required in delivery of a predetermined amount of ice chips by the feedback control using the sensor 38 becomes larger than a predetermined time period, in determination of no or insufficient stock of ice chips in the ice container 32. In other words, the ice feed control block 41 causes the timer 47 to deliver the no stock-determining reference signal (high-level signal) having a duration of e.g. 4.5 seconds to the AND gate 48 in synchronism with a rise of the ice gate opening signal for opening the ice gate 35. Therefore, if a time period during which ice chips are delivered becomes longer than 4.5 seconds, the AND gate 48, which delivers the logical product (AND) of the no stock-determining reference signal and the opening signal from the ice amount measuring block 44, as a no-stock signal (high-level signal), eventually delivers the no-stock signal (high-level signal) having a duration of 4.5 seconds to the ice feed control block 41. When the no-stock signal having a duration of 4.5 seconds is supplied, the ice feed control block 41 determines that there is not a sufficient stock of ice chips for vending an iced product, and supplies a no-ice signal to a vend control unit 50. In response to the no-ice signal, the vend control unit 50 performs vend stop control for a predetermined time period (e.g. 10 minutes), e.g. by delivering an vend stop signal to the display 53 to display "OUT OF ORDER", and/or by returning a coin put into the vending machine. It should be noted that when the duration of the no-stock signal is shorter than 4.5 seconds, the ice feed control unit 41 determines that there is a sufficient stock of ice chips and hence does not deliver the no-ice signal to the vend control unit 50, thereby continuing vend of products.

In the present embodiment, the no stock-determining reference signal is set to 4.5 seconds for the following reasons: As is clear from FIG. 5, so long as the time period (delivery time) required for delivery of 100 g of ice chips is within 4.5 seconds, ice chips can be supplied reliably. If it takes more time in delivering the predetermined amount of ice chips, it cannot be assured any longer that the predetermined amount of ice chips will be supplied in the following vending operation. Therefore, it is desirable that the vend stop control be performed immediately after the delivery time exceeds 4.5 seconds. Further, a vend stop control time period over which the vend stop control should be performed can be set as desired. In the present embodiment, this time period is set to 10 minutes which is required in making an amount (approximately 300 g) of ice chips sufficient for use in three cups of iced coffee. The no stock-determining reference time period and the vend stop control time period are not limited to those set in the present embodiment, but can be changed as desired such that they meet the capacities of the ice freezer 9 including the ice container 32, and vending conditions, such as expected vending rates.

On the other hand, after ten minutes have elapsed, the vending machine is in a normal standby state for a vending operation, and when the ice feed control block 41 receives the selected product signal from the selected product data input block 51, it starts to perform ice chip supply control (control of opening and closing of the ice gate 35), in which monitoring by the ice feed control block 41 for generation of the no-stock signal having a duration of 4.5 seconds is carried out, as described above. If the no-stock signal is supplied to the ice feed control block for 4.5 seconds, the vend stop control operation is performed again.

Figure 6:
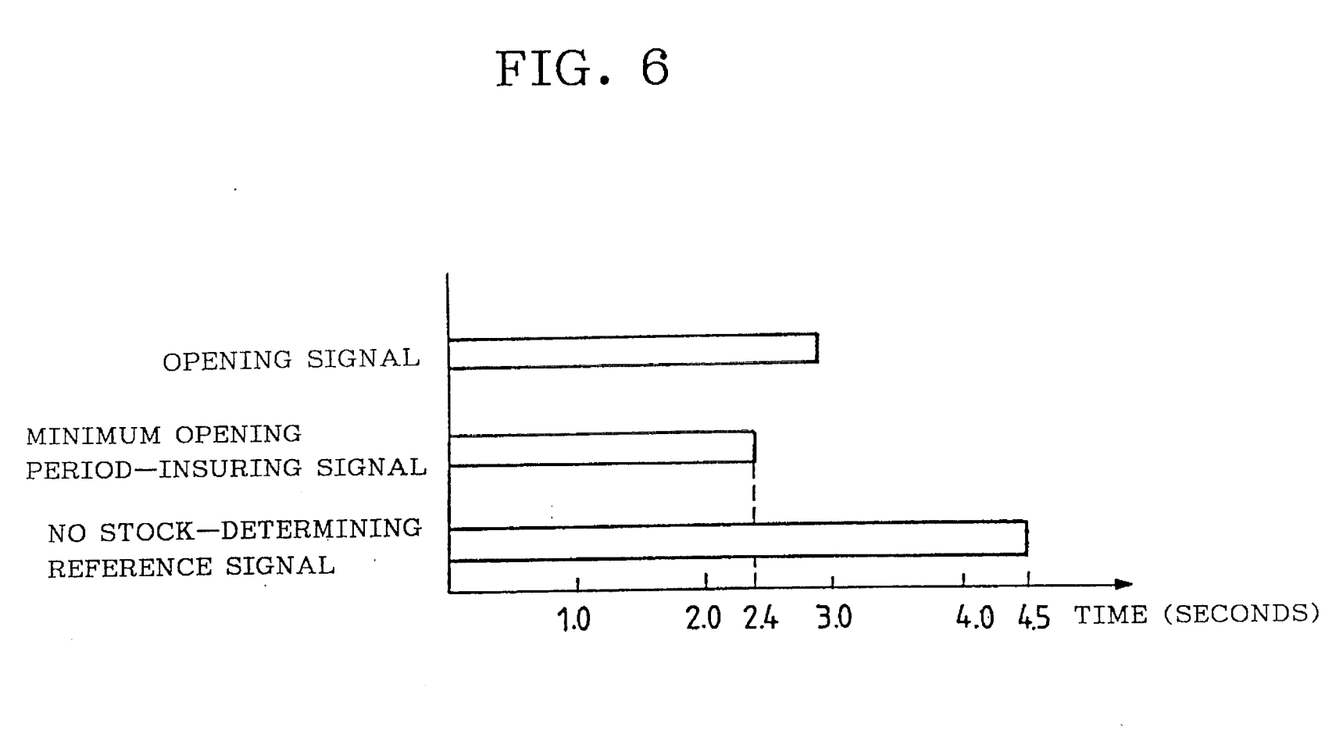
FIG. 6 is a diagram showing a relationship between an opening signal, a minimum opening period-insuring signal, and a no stock-determining reference signal.

FIG. 6 shows an example of signals mentioned above, which are actually generated. A top bar, a middle bar, and a bottom bar, depicted in the figure, represent the opening signal delivered from the ice amount measuring block 44, the minimum opening period-insuring signal delivered from the ice feed control block 41, and the no stock-determining reference signal delivered from the timer 47, respectively. In this example, the duration of the opening signal is shorter than 3 seconds, i.e. the predetermined time period set for opening the ice gate 36 to deliver the predetermined amount (100 g) of ice chips. This is because the amount of ice chips actually delivered per unit time was larger than a predetermined reference one, and hence the duration of the opening signal is reduced by the feedback control of the control unit 40 to be shorter than 3 seconds. Further, the minimum opening period-insuring signal is set to a duration of 2.4 seconds, which is fixed, while the no stock-determining reference signal is set to a duration of 4.5 seconds (no stock-determining reference time period).

As described heretofore, according to the present invention, by the use of the no stock-determining reference signal, it is possible to determine that there is an insufficient stock of ice chips held in the ice container 32 immediately before the ice chips are used up, which makes it possible to perform accurate vend stop control. Therefore, when the ice feeder of the present invention is used in a vending machine, it is possible to maintain quality of vend products by preventing a non-iced product (beverage) from being supplied when a purchaser selected an iced product, as well as to prevent the vending machine from entering the vend stop status due to erroneous determination of no ice stock when there is actually a sufficient amount of ice chips in stock.

In the above embodiment, the ice feeder performs the feedback control such that an amount of ice chips actually delivered to the cup 1 which is detected by the sensor 38 becomes equal to the predetermined amount. However, in the case of a variation of the ice feeder in which the ice feed control block 41 controls the ice gate 36 to open for a predetermined or fixed time period to deliver ice chips, a no-ice signal can be generated by detecting the amount of ice chips delivered or having passed before the sensor 38. More specifically, the ice amount measuring block 44 determines an amount of ice chips delivered and passed before the sensor 38 by the ice chip passing signals from the sensor 38, and data of this amount of ice chips delivered is supplied to the ice feed control block 41. The ice feed control block 41 generates a no-stock signal, when the amount of ice chips delivered during the predetermined or fixed time period is smaller than the predetermined value (which is set, in the present variation, to a value of e.g. 80 g, which is smaller than 100 g), or alternatively when an amount of ice chips delivered per unit time, which is obtained by dividing the data of the amount of ice chips delivered by the predetermined or fixed time period for opening the ice gate 36, is smaller than a predetermined value (which is set, in the present variation, to a rate of e.g. 35 g/sec., which is smaller than 33 g/sec., since it normally takes 3 seconds to deliver 100 g of ice chips). This variation makes it possible to determine, as accurately as in the above embodiment, that there is not a sufficient amount of ice chips remaining in stock in the ice container 32, immediately before the ice chips are used up. As a result, the present ice feeder makes it possible to perform accurate vend stop control in vending machines and the like.

Further, it should be noted that the present invention is by no means limited to the above embodiment and its variation which are described by way of example. The present invention can be applied to ice feeders for use in all vending machines in which iced beverages, such as iced tea, iced juice, and iced cola, are prepared or cooked for sale, ice dispensers, and so on.

Further, although in the above embodiment, description has been made of a case in which the sensor is implemented by transmission-type optical sensors, this is not limitative, but other types of sensors including a reflection-type optical sensor can be used as well.

What is claimed is:

1. An ice feeder comprising:

ice storing means for storing ice;

an ice gate provided in said ice storing means for controlling delivery of said ice from said ice storing means;

a supply passage extending from said ice gate for supplying said ice therethrough;

sensor means arranged in said supply passage for detecting passage of said ice delivered from said ice storing means and for generating a detection signal indicative of said passage of said ice;

supply amount measuring means for measuring an amount of said ice delivered, based on said detection signal from said sensor means; and control means for generating a no-ice-stock signal indicative of an insufficient stock of ice held in said ice storing means when a time period required for said amount of said ice delivered which is measured by said supply amount measuring means to reach a first predetermined value exceeds a first predetermined time period.

2. An ice feeder according to claim 1, further comprising supply inhibiting means for inhibiting said ice feeder from supplying said ice for a second predetermined time period.

3. An ice feeder according to claim 2, wherein said supply inhibiting means has display means for displaying a no-ice-stock state of said ice feeder.

4. An ice feeder according to claim 1, further comprising actuator means for controlling the opening and closing of said ice gate, wherein said control means delivers a gate-closing command signal to said actuator means to cause said actuator means to close said ice gate when said amount of said ice delivered which is measured by said supply amount measuring means has reached said first predetermined value.

5. An ice feeder according to claim 2, further comprising actuator means for controlling the opening and closing of said ice gate, wherein said control means delivers a gate-closing command signal to said actuator means to cause said actuator means to close said ice gate when said amount of said ice delivered which is measured by said supply amount measuring means has reached said first predetermined value.

6. An ice feeder according to claim 4, wherein said control means delivers an opening command signal to said actuator means to cause said actuator means to open said ice gate for a third predetermined time period which is shorter than a time period normally corresponding to said first predetermined value of said amount of said ice delivered, irrespective of whether said amount of said ice delivered which is measured by said supply amount measuring means has reached said first predetermined value.

7. An ice feeder according to claim 5, wherein said control means delivers an opening command signal to said actuator means to cause said actuator means to open said ice gate for a third predetermined time period which is shorter than a time period normally corresponding to said first predetermined value of said amount of said ice delivered, irrespective of whether said amount of said ice delivered which is measured by said supply amount measuring means has reached said first predetermined value.

8. An ice feeder according to claim 2, further comprising ice making means for making ice and for supplying said ice thus made to said ice storing means, wherein said second predetermined time period is equal to a time period required by said ice making means to make a second predetermined amount of ice.

9. An ice feeder according to claim 4, further comprising supply signal input means for inputting to said ice feeder a supply command signal directing supplying of said ice, wherein said actuator means starts to cause said ice gate to open at the same time as said supply command signal is input, and on the other hand, said control means starts to measure said first predetermined time period at the same time said supply command signal is input.

10. An ice feeder according to claim 5, further comprising supply signal input means for inputting to said ice feeder a supply command signal directing supplying of said ice, wherein said actuator means starts to cause said ice gate to open at the same time as said supply command signal is input, and on the other hand, said control means starts to measure said first predetermined time period at the same time said supply command signal is input.

11. An ice feeder comprising:

ice storing means for storing ice;

an ice gate provided in said ice storing means for controlling delivery of said ice from said ice storing means;

a supply passage extending from said ice gate for supplying said ice therethrough;

sensor means arranged in said supply passage for detecting passage of said ice delivered from said ice storing means and generating a detection signal indicative of said passage of said ice;

supply amount measuring means for measuring an amount of said ice delivered, based on said detection signal from said sensor means; and control means for generating a no-ice-stock signal indicative of an insufficient stock of ice held in said ice storing means when said amount of said ice delivered from said ice storing means which is measured by said supply amount measuring means does not reach a first predetermined value within a first predetermined time period.

12. An ice feeder according to claim 11, further comprising supply inhibiting means for inhibiting said ice feeder from supplying said ice for a second predetermined time period.

13. An ice feeder according to claim 12, wherein said supply inhibiting means has display means for displaying a no-ice-stock state of said ice feeder.

14. An ice feeder according to claim 11, further comprising actuator means for controlling the opening and closing of said ice gate, wherein said control means performs control such that said actuator means causes said ice gate to open for said first predetermined time period.

15. An ice feeder according to claim 12, further comprising actuator means for controlling the opening and closing of said ice gate, wherein said control means performs control such that said actuator means causes said ice gate to open for said first predetermined time period.

16. An ice feeder according to claim 12, further comprising ice making means for making ice and for supplying said made ice to said ice storing means, wherein said second predetermined time period is equal to a time period required by said ice making means to make a second predetermined amount of ice.

* * * * *